US008861543B2

(12) United States Patent
Sato

(10) Patent No.: US 8,861,543 B2
(45) Date of Patent: Oct. 14, 2014

(54) APPARATUS AND METHOD FOR CHANGING DATA TRANSMISSION SCHEMES

(75) Inventor: Yoshizo Sato, Daito (JP)

(73) Assignee: Kyocera Corporation, Kyoto (JP)

( * ) Notice: Subject to any disclaimer, the term of this patent is extended or adjusted under 35 U.S.C. 154(b) by 245 days.

(21) Appl. No.: 13/360,638

(22) Filed: Jan. 27, 2012

(65) Prior Publication Data

US 2012/0195217 A1 Aug. 2, 2012

(30) Foreign Application Priority Data

Jan. 27, 2011 (JP) ................................ 2011-015751

(51) Int. Cl.
*H04J 3/16* (2006.01)
*H04L 1/00* (2006.01)
*H04L 1/18* (2006.01)
*H04L 12/26* (2006.01)
*H04W 24/00* (2009.01)

(52) U.S. Cl.
CPC ............ *H04L 1/0009* (2013.01); *H04L 1/0007* (2013.01); *H04L 1/0021* (2013.01); *H04L 1/0003* (2013.01); *H04L 1/1867* (2013.01); *H04L 1/0016* (2013.01)
USPC .......................................... 370/437; 370/252

(58) Field of Classification Search
USPC .......... 370/437, 329, 339, 338, 252; 714/748; 709/231
See application file for complete search history.

(56) References Cited

U.S. PATENT DOCUMENTS

| 2007/0183442 | A1* | 8/2007 | Shibata .......................... 370/437 |
| 2010/0083067 | A1* | 4/2010 | Fujimoto et al. .............. 714/748 |
| 2010/0185777 | A1* | 7/2010 | Kim et al. ...................... 709/231 |
| 2011/0051709 | A1* | 3/2011 | Roberts .......................... 370/339 |
| 2013/0028213 | A1* | 1/2013 | Ko et al. ......................... 370/329 |
| 2013/0188630 | A1* | 7/2013 | Song et al. ..................... 370/338 |

* cited by examiner

*Primary Examiner* — Helal A Algahaim
*Assistant Examiner* — Mahmoud Ismail
(74) *Attorney, Agent, or Firm* — Duane Morris LLP

(57) ABSTRACT

A communication device and methods are disclosed. A first throughput is calculated when a current modulation scheme and a current encoding rate is changed, and a second throughput is calculated when a current retransmission unit is changed. The current modulation scheme and the current encoding rate are changed to provide a changed modulation scheme and a changed encoding rate, if the first throughput is greater than or equal to the second throughput when prescribed conditions are met. The current retransmission unit is changed to provide a changed retransmission unit, if the first throughput is less than the second throughput. Information is transmitted to a communication device of a communication partner based on the changed modulation scheme, the changed encoding rate, and the changed retransmission unit.

20 Claims, 14 Drawing Sheets

Figure 2

| CINR | MCS |
|---|---|
| CINR ≦ x1 | QPSK 1/2 |
| x1 < CINR ≦ x2 | QPSK 3/4 |
| x2 < CINR ≦ x3 | 16QAM 1/2 |
| x3 < CINR ≦ x4 | 16QAM 3/4 |
| x4 < CINR ≦ x5 | 64QAM 1/2 |
| x5 < CINR ≦ x6 | 64QAM 2/3 |
| x6 < CINR ≦ x7 | 64QAM 3/4 |
| x7 < CINR | 64QAM 5/6 |

Figure 3A

| CINR | QPSK 1/2 | QPSK 3/4 | 16QAM 1/2 | 16QAM 3/4 | 64QAM 1/2 | 64QAM 2/3 | 64QAM 3/4 | 64QAM 5/6 |
|---|---|---|---|---|---|---|---|---|
| 0 | a01% | b01% | c01% | d01% | e01% | f01% | g01% | h01% |
|  | a02% | b02% | c02% | d02% | e02% | f02% | g02% | h02% |
|  | a03% | b03% | c03% | d03% | e03% | f03% | g03% | h03% |
|  | a04% | b04% | c04% | d04% | e04% | f04% | g04% | h04% |
|  | a05% | b05% | c05% | d05% | e05% | f05% | g05% | h05% |
|  | . | . | . | . | . | . | . | . |
|  | . | . | . | . | . | . | . | . |
|  | . | . | . | . | . | . | . | . |

Figure 3B

| CINR | QPSK 1/2 | QPSK 3/4 | 16QAM 1/2 | 16QAM 3/4 | 64QAM 1/2 | 64QAM 2/3 | 64QAM 3/4 | 64QAM 5/6 |
|---|---|---|---|---|---|---|---|---|
| 1 | a11% | b11% | c11% | d11% | e11% | f11% | g11% | h11% |
|  | a12% | b12% | c12% | d12% | e12% | f12% | g12% | h12% |
|  | a13% | b13% | c13% | d13% | e13% | f13% | g13% | h13% |
|  | a14% | b14% | c14% | d14% | e14% | f14% | g14% | h14% |
|  | a15% | b15% | c15% | d15% | e15% | f15% | g15% | h15% |
|  | . | . | . | . | . | . | . | . |
|  | . | . | . | . | . | . | . | . |
|  | . | . | . | . | . | . | . | . |

Figure 7A

| CINR | QPSK 1/2 | QPSK 3/4 | 16QAM 1/2 | 16QAM 3/4 | 64QAM 1/2 | 64QAM 2/3 | 64QAM 3/4 | 64QAM 5/6 |
|---|---|---|---|---|---|---|---|---|
| 0 | Δua1% | Δub1% | Δuc1% | Δud1% | Δue1% | Δuf1% | Δug1% | |
| 1 | Δua2% | Δub2% | Δuc2% | Δud2% | Δue2% | Δuf2% | Δug2% | |
| 2 | Δua3% | Δub3% | Δuc3% | Δud3% | Δue3% | Δuf3% | Δug3% | |
| 3 | Δua4% | Δub4% | Δuc4% | Δud4% | Δue4% | Δuf4% | Δug4% | |
| 4 | Δua5% | Δub5% | Δuc5% | Δud5% | Δue5% | Δuf5% | Δug5% | |
| . | . | . | . | . | . | . | . | |
| . | . | . | . | . | . | . | . | |
| . | . | . | . | . | . | . | . | |

Figure 7B

| CINR | QPSK 1/2 | QPSK 3/4 | 16QAM 1/2 | 16QAM 3/4 | 64QAM 1/2 | 64QAM 2/3 | 64QAM 3/4 | 64QAM 5/6 |
|---|---|---|---|---|---|---|---|---|
| 0 | | −Δda1% | −Δdb1% | −Δdc1% | −Δdd1% | −Δde1% | −Δdf1% | −Δdg1% |
| 1 | | −Δda2% | −Δdb2% | −Δdc2% | −Δdd2% | −Δde2% | −Δdf2% | −Δdg2% |
| 2 | | −Δda3% | −Δdb3% | −Δdc3% | −Δdd3% | −Δde3% | −Δdf3% | −Δdg3% |
| 3 | | −Δda4% | −Δdb4% | −Δdc4% | −Δdd4% | −Δde4% | −Δdf4% | −Δdg4% |
| 4 | | −Δda5% | −Δdb5% | −Δdc5% | −Δdd5% | −Δde5% | −Δdf5% | −Δdg5% |
| . | | . | . | . | . | . | . | . |
| . | | . | . | . | . | . | . | . |
| . | | . | . | . | . | . | . | . |

APPARATUS AND METHOD FOR CHANGING DATA TRANSMISSION SCHEMES

CROSS-REFERENCE TO RELATED APPLICATION

The present application claims priority under 35 U.S.C. §119 to Japanese Patent Application No. 2011-015751, filed on Jan. 27, 2011, entitled "COMMUNICATION DEVICE, AND METHOD FOR COMMUNICATION". The content of which is incorporated by reference herein in its entirety.

FIELD

Embodiments of the present disclosure relate generally to communication devices, and more particularly relate to a mobile electronic device having an adaptive modulation scheme.

BACKGROUND

Adaptive modulation schemes are used to transmit signals at an optimum transmission rate according to a propagation environment of communication paths.

SUMMARY

A communication device and methods are disclosed. A first throughput is calculated when a current modulation scheme and a current encoding rate is changed, and a second throughput is calculated when a current retransmission unit is changed. The current modulation scheme and the current encoding rate are changed to provide a changed modulation scheme and a changed encoding rate, if the first throughput is greater than or equal to the second throughput when prescribed conditions are met. The current retransmission unit is changed to provide a changed retransmission unit, if the first throughput is less than the second throughput. Information is transmitted to a communication device of a communication partner based on the changed modulation scheme, the changed encoding rate, and the changed retransmission unit.

In an embodiment, a communication device comprises a first calculating module, a second calculating module, a setting module, and a transmission module. The first calculating module calculates a first throughput when a current modulation scheme and a current encoding rate are changed. The second calculating module calculates a second throughput when a current retransmission unit is changed. The setting module changes the current modulation scheme and the current encoding rate to provide a changed modulation scheme and a changed encoding rate, if the first throughput is greater than or equal to the second throughput when prescribed conditions are met. The setting module further changes the current retransmission unit to provide a changed retransmission unit, if the first throughput is less than the second throughput, when the prescribed conditions are met. The transmission module operable to transmit data based on the changed modulation scheme, the changed encoding rate, and the changed retransmission unit.

In another embodiment, a communication method of a communication device calculates a first throughput when a current modulation scheme and a current encoding rate is changed, and calculates a second throughput when a current retransmission unit is changed. The communication method further changes the current modulation scheme and the current encoding rate to provide a changed modulation scheme and a changed encoding rate, if the first throughput is greater than or equal to the second throughput when prescribed conditions are met. The communication method further changes the current retransmission unit to provide a changed retransmission unit, if the first throughput is less than the second throughput. The communication method further transmits information to a communication device of a communication partner based on the changed modulation scheme, the changed encoding rate, and the changed retransmission unit.

In a further embodiment, a computer readable storage medium comprises computer-executable instructions for performing a communication method of a communication device. The method executed by the computer-executable instructions calculates a first throughput when a current modulation scheme and a current encoding rate is changed, and calculates a second throughput when a current retransmission unit is changed. The method executed by the computer-executable instructions further changes the current modulation scheme and the current encoding rate to provide a changed modulation scheme and a changed encoding rate, if the first throughput is greater than or equal to the second throughput when prescribed conditions are met. The method executed by the computer-executable instructions further changes the current retransmission unit to provide a changed retransmission unit, if the first throughput is less than the second throughput. The method executed by the computer-executable instructions further transmits information to a communication device of a communication partner based on the changed modulation scheme, the changed encoding rate, and the changed retransmission unit.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 2 is an illustration of an exemplary Modulation and Code Scheme (MCS) table according to an embodiment of the disclosure.

FIGS. 3A-3B are illustrations of exemplary PER estimates tables according to embodiments of the disclosure.

FIGS. 7A-7B are illustrations of exemplary Packet Error Rate (PER) estimated-changes tables according to embodiments of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a communication between a mobile communication device such as a mobile phone and a base station. Embodiments of the disclosure, however, are not limited to such base station-mobile phone communication, and the techniques described herein may be utilized in other applications. For example, embodiments may be applicable to relay stations, wireless modems, digital music players, personal digital assistance (PDA), personal handy phone system (PHS), lap top computers, TV's, GPS's or navigation systems, pedometers, health equipment, display monitors, and other communication device communicating with a base station, an access point base station, or other base station.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

In an adaptive modulation scheme, a communication device acquires a quality of received signals by the communication device of a partner, and by adaptively switching the Modulation and Code Scheme (MCS) based on the acquired quality, an optimum transmission rate (i.e., a high throughput) can be achieved. The communication device may also realize a high throughput by switching the retransmission unit instead of the MCS. Therefore, there are times when a higher throughput is obtained by switching the MCS, and times when a higher throughput is obtained by switching the retransmission unit.

Figure 1:
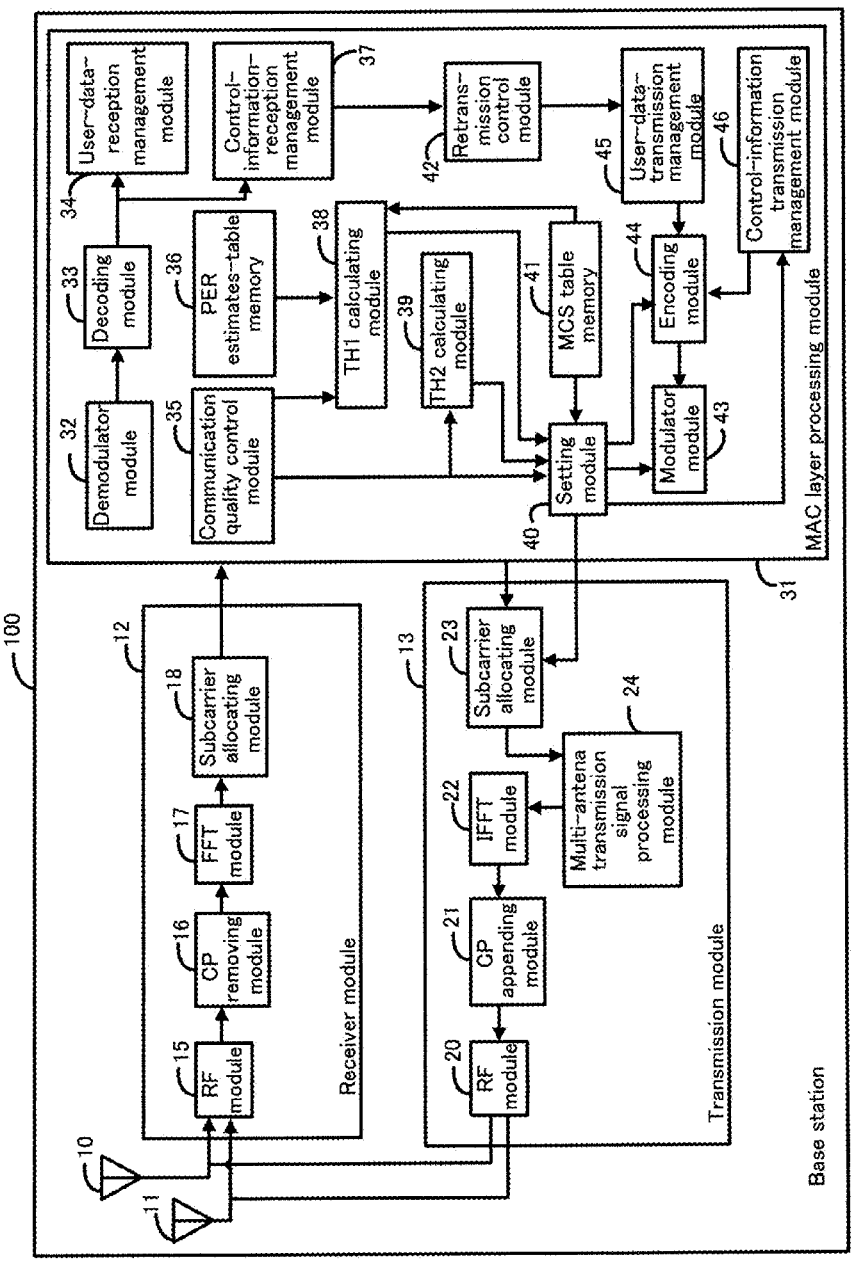
FIG. 1 is an illustration of a functional block diagram of a base station according to an embodiment of the disclosure.

FIG. 1 is an illustration of an exemplary functional block diagram of a base station according to an embodiment of the disclosure. The base station 100 may comprise a first antenna 10, a second antenna 11, a receiver module 12, a transmission module 13, and a Media Access Control (MAC) layer processing module 14. The first antenna 10, and the second antenna 11 suitably support a particular wireless communication protocol and modulation scheme to transmit and receive data signals. The wireless communication protocol and modulation scheme may comprise, for example but without limitation, Wireless Interoperability for Microwave Access (WiMAX), or other wireless communication protocol and modulation scheme.

The transmission module 13 comprises a multi-antenna transmission-signal processing module 24, a subcarrier allocating module 23, an Inverse Fast Fourier Transform (IFFT) module 22, a Cyclic Prefix (CP) appending module 21, and a Radio Frequency (RF) module 20. The transmission module 13 is configured to transmit data/information based on a changed modulation scheme, a changed encoding rate, and a changed retransmission unit. Further the transmission module 13 is configured to transmit control data comprising information defining a region of each retransmission unit as explained in more detail below.

The subcarrier allocating module 23 allocates subcarriers based on, for example, Partial Usage of Subchannels (PUSC).

The multi-antenna transmission-signal processing module 24 transmits signals using a Multi Input Multi Output (MIMO) communication system, in which multiple antennas are combined to increase a bandwidth for data transmission and reception.

The IFFT module 22 converts multiple subcarrier signals in frequency domain (frequency domain signals) output from the multi-antenna transmission-signal processing module 24 into time domain signals comprising Orthogonal Frequency Division Multiple Access (OFDMA) symbols through IFFT.

The CP appending module 21 appends the same signal as that of an end portion of the OFDMA symbol to the beginning of the OFDMA symbol as a CP.

The RF module 20 comprises an upconverter that up converts signals to a radio frequency band, a power amplifier circuit that amplifies up converted signals, and a band-pass filter that allows only signal components of a desired band to pass through from among the amplified signals and outputs them to the first antenna 10 and the second antenna 11.

The receiver module 12 comprises an RF module 15, a CP removing module 16, a Fast Fourier Transform (FFT) module 17, and a subcarrier allocating module 18.

The RF module 15 comprises a band-pass filter that allows only signal components of a desired band to pass through from among the signals output from the first antenna 10 and the second antenna 11, a low-noise amplifier circuit that amplifies RF signals, and a down converter that down converts RF signals.

The CP removing module 16 removes the CP from signals output from the RF module 15.

The FFT module 17 converts time domain signals output from the CP removing module 16 into frequency domain signals through FFT, and demodulates them into multiple subcarriers.

The subcarrier allocating module 18 extracts each subcarrier output from the FFT module 17 based on, for example, PUSC.

The MAC layer processing module 31 comprises a demodulator module 32, a decoding module 33, a user-data-reception management module 34, a control-information-reception management module 37, a communication quality control module 35, a PER estimates-table memory 36, a TH1 calculating module 38, a TH2 calculating module 39, a setting module 40, an MCS table memory 41, a retransmission control module 42, a control-information-transmission management module 46, a user-data-transmission management module 45, an encoding module 44, and a modulator module 43.

The demodulator module 32 demodulates uplink signals from a mobile phone.

The decoding module 33 decodes the demodulated uplink signals.

The user-data-reception management module 34 manages user data received from a mobile phone.

The control-information-reception management module 37 manages control information for ranging regions, Channel Quality Information Channel (CQICH) regions, and ACK/NACK received from a mobile phone.

The communication quality control module 35 periodically receives, from the mobile phone of a communication partner, the Packet Error Rate (PER) of signals received by that mobile phone (i.e., downlink signals) and the Carrier-to-Interference-and-Noise Ratio (CINR) of the downlink signals, or notifications of information that may substitute for these. The PER represents a proportion of packets with errors among received packets. The CINR is represented as a value obtained by dividing the carrier power by the sum of the interference signal code power and the noise power.

In one embodiment, the MCS table memory 41 stores a required range comprising carrier-to-interference-and-noise ratios (required CINRs) corresponding to levels of modulation schemes and encoding rates (MCS levels). The MSC table memory 41 stores an MCS table as shown in FIG. 2. The MCS establishes modulation schemes (QPSK, 16 QAM, 64 QAM, etc.) and code rates (1/2, 2/3, 3/4, etc.). The MCS table 41 defines associations between ranges of required CINRs and MCSs. The ranges of required CINRs may be calculated using, for example but without limitation, theoretical values, simulations, actual measurement results, or other method.

As explained in more detail below, in one embodiment, the TH1 calculating module 38, calculates a first throughput by subtracting a first amount of data required to transmit the control data within a prescribed time from a second amount of data that can be transmitted within the prescribed time under the changed modulation scheme and a changed encoding rate, a current retransmission unit, and an acquired error rate. The TH2 calculating module 39 calculates a second throughput by subtracting a third amount of data required to transmit a control data comprising information defining a region of a changed retransmission unit within the prescribed time from a fourth amount of data that can be transmitted within the prescribed time under the current modulation scheme and the current encoding rate, a changed retransmission unit, and the acquired error rate.

As explained in more detail below, in one embodiment, the TH1 calculating module 38 calculates the first throughput when the current modulation scheme and the current encoding rate are shifted down by one stage. The TH2 calculating module 39 calculates the second throughput when the current retransmission unit is decreased within a prescribed range to provide a maximum throughput, and identifies the retransmission unit when the second throughput reaches the maximum throughput to provide a reduced retransmission unit.

FIG. 2 is an illustration of an exemplary MCS table according to an embodiment of the disclosure. For example, a range of required CINRs that is equal to or less than x1 [dB] corresponds to QPSK 1/2. When the MCS is QPSK 1/2, the throughput is at its minimum. As the MCS advances to QPSK 3/4 and 16 QAM 1/2, etc., the throughput increases, and when the MCS is 64 QAM 5/6, the throughput it at its maximum.

In this document an act of changing the MCS in the direction that increases the throughput is referred to as "raising (shifting up) the MCS", while an act of changing the MCS in the direction that decreases the throughput is referred to as "lowering (shifting down) the MCS".

The PER estimates-table memory 36 stores a PER estimates table as shown in FIGS. 3A-3B that defines: the estimated packet error rates (PERs) for when the MCS is shifted down by one stage under a current MCS, a current CINR, a current PER, the estimated PER for when the MCS is shifted up by one stage under the current MCS, the current CINR, and the current PER.

FIGS. 3A-3B are illustrations of exemplary PER estimates tables according to embodiments of the disclosure. In FIG. 3A, if the current CINR is 0, estimated PERs are defined for when the MCS is changed in relation to the PER of the current MCS. For example, when the CINR is 0, the current MCS is 16 QAM 3/4, and the PER is d01(%), d02(%), d03(%), etc., the estimated PERs when the MCS is shifted up to 64 QAM 1/2 are e01(%), e02(%), e03(%), etc., and the estimated PERs when the MCS is shifted up to 16 QAM 1/2 are c01(%), c02(%), c03(%), etc.

In FIG. 3B, if the current CINR is 1, estimated PERs are defined for when the MCS is changed in relation to the PER of the current MCS. For example, when the CINR is 1, the current MCS is 16 QAM 3/4, and the PER is d11(%), d12(%), d13(%), etc., the estimated PERs when the MCS is shifted up to 64 QAM 1/2 are e11(%), e12(%), e13(%), etc., and the estimated PERs when the MCS is shifted up to 16 QAM 1/2 are c11(%), c12(%), c13(%), etc.

Figure 4:
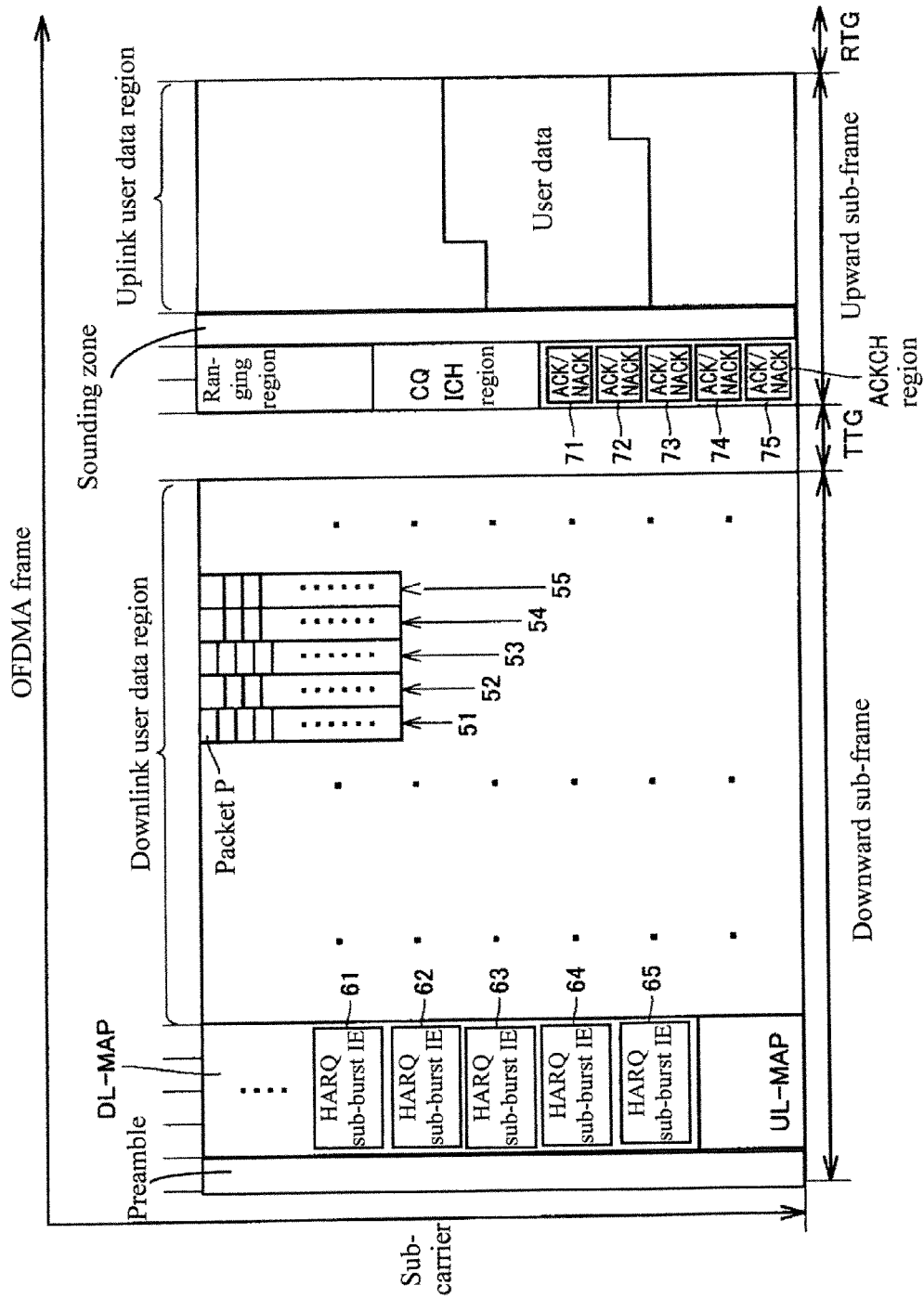
FIG. 4 is an illustration of an exemplary diagram of Hybrid Automatic Repeat Request (HARQ) sub-burst and HARQ sub-burst IE according to an embodiment of the disclosure.

FIG. 4 is an illustration of an exemplary diagram of Hybrid Automatic Repeat Request (HARQ) sub-burst and HARQ sub-burst IE according to an embodiment of the disclosure. As shown in FIG. 4, the OFDMA (frame includes a downward sub-frame and an upward sub-frame. The horizontal axis and the vertical axis represent the time axis and the frequency axis respectively. The horizontal axis displays the time axis using symbols as units. The vertical axis displays the frequency axis using sub-channels as units. Both the downward sub-frame and the upward sub-frame are represented two-dimensionally with a time axis provided using OFDM symbols (unit time) and a frequency axis provided using sub-channels. The sub-channels are configured from multiple subcarriers. In the following, the time-axis direction provided using symbols may be referred to as the symbol direction, and the frequency-axis direction provided using sub-channels may be referred to as the sub-channel direction.

The downward sub-frame comprises a preamble, a Downlink Map (DL-MAP), an Uplink Map (UL-MAP), and a downlink user data region. Sub-frames may be referred to as sub-frames. In the UL-MAP, allocation information of upward wireless resources, such as information related to the uplink user data region, is allocated.

In the downlink user data region, downward user data (bursts) are allocated. The user data (bursts) are divided into HARQ sub-bursts, which are a HARQ retransmission unit. In FIG. 4, HARQ sub-bursts 51-55 are shown as representative examples.

In the preamble, known signals used for establishing synchronicity, etc. are allocated.

In the DL-MAP, allocation information of downward wireless resources, such as information related to the downlink user data region, is allocated. The DL-MAP includes a HARQ sub-bursts IE for each HARQ sub-burst (retransmission unit).

The HARQ sub-bursts IE comprises information for identifying the position of the HARQ sub-bursts, as well as an ACK/NACK Enable or ACK/NACK Disable, which are information related to the retransmission control of the HARQ sub-burst.

If the retransmission control is ACK/NACK Enable, this indicates that retransmission control is necessary. In this case, a channel (Acknowledgement Channel (ACKCH)) for transmitting a response is allocated to the mobile phone. If the mobile phone is able to receive the HARQ sub-bursts normally (i.e., if there is no communication error), the base station 100 receives an ACK signal from the mobile phone via this response channel, and if the HARQ burst was not received normally (i.e., if there was a communication error), the base station 100 receives a NACK signal from the mobile phone via this response channel. If the retransmission control is ACK/NACK Disable, this indicates that retransmission control is not necessary. In this case, no channel for transmitting a response is allocated to the mobile phone. Regardless of whether the mobile phone has received the HARQ burst normally, the base station 100 does not receive an ACK signal or NACK signal from the mobile phone.

In an embodiment the HARQ sub-bursts IEs 61, 62, 63, 64, 65 are associated with the HARQ sub-bursts 51, 52, 53, 54, 55. The DL-MAP is configured by including the HARQ burst.

The upward sub-frame comprises a ranging region, a CQICH region, an ACKCH region, and an uplink user data region.

In the ranging region, ranging signals are allocated.

In the CQICH region, signals representing channel quality are allocated.

In the ACKCH region, signals representing channel acknowledgement responses (ACK/NACK) are allocated. As shown in FIG. 4, the ACK/NACKs 71, 72, 73, 74, 75 are associated with the HARQ SUB-BURSTs 51, 52, 53, 54, 55. The ACKCH region is configured by including the ACK/NACKs 71, 72, 73, 74, 75.

In the sounding zone, sounding signals are allocated.

In the uplinked user data region, upward user data are allocated.

The setting module 40 refers to the MCS table and sets the MCS so that the acquired CINR is included in the range of required CINRs. For example, if the acquired CINR is greater than x3 and equal to or less than x4, the setting module 40 sets the MCS to 16 QAM 3/4.

If the conditions for changing the MCS are met, the TH1 calculating module 38 and the TH2 calculating module 39 calculate the throughput after the change in MCS and the throughput after the change in the HARQ retransmission unit.

When the number of wireless resources (sub-carriers) of the downward sub-frame is defined as F, the amount of data (bits) that can be transmitted per unit sub-carrier when MCS=i is defined as M (i), the amount of data (bits) that can be transmitted per HARQ retransmission unit (sub-burst) of the downward user data region is defined as n, the number of wireless resources (sub-carriers) required for transmitting control data (i.e., the DL-MAP, the UL-MAP, and the preamble) is defined as C (n), the PER when MCS=i is defined as P (i), and the average packet size is defined as S, the effective transmission quantity (throughput) TH per one frame (i.e., per frame period) is calculated using the following formula.

$$TH(n,i)=(F-C(n))\times(i)\times(1-P(i))(n/S) \quad (1)$$

If the conditions for shifting down the MCS are met, the TH1 calculating module 38 reads out the estimated PER when the MCS is shifted down by one stage under the current MCS, the acquired CINR, and the acquired PER from the PER estimates table.

If the conditions for shifting down the MCS are met, the TH1 calculating module 38 uses the estimated PER when the MCS is shifted down by one stage as the value for P (i) in Formula (1) to calculate the estimated value TH1 of the throughput when the MCS is shifted down by one stage. In Formula (1), the value of TH (n, i) when n is fixed and the value of i is decreased by 1 is calculated as the throughput TH1.

If the conditions for shifting down the MCS are met, the TH2 calculating module 39 calculates a size N (bits) for the HARQ sub-burst producing the highest throughput when the size (bits) of the HARQ sub-burst within the downward user data region is decreased within a prescribed range, as well as the estimated value TH2 of the throughput at that size N (bits). In Formula (1), the value of i with which the value of TH (n, i) is greatest when i is fixed and the value of n is decreased is defined as the size N (bits), and the value of TH (n, i) at that time is calculated as the throughput TH2.

If the conditions for shifting up the MCS are met, the TH1 calculating module 38 reads out the estimated PER for when the MCS is shifted up by one stage from the PER estimates table using the current MCS, the acquired CINR, and the acquired PER.

If the conditions for shifting up the MCS are met, the TH1 calculating module 38 uses the estimated PER for when the MCS is shifted up by one stage as the value P (i) of Formula (1) to calculate the estimated value TH1 of the throughput when the MCS is shifted up by one stage. In other words, in Formula (1), the value of TH (n, i) when n is fixed and the value of i is increased by one is calculated as the throughput TH1.

If the conditions for shifting up the MCS are met, the TH2 calculating module 39 calculates a size (bits) for the HARQ sub-burst producing the highest throughput when the size (bits) of the HARQ SUB-BURST within the downward user data region is increased within a prescribed range, as well as the estimated value TH2 of the throughput at that size N (bits). In other words, in Formula (1), the value of i with which the value of TH (n, i) becomes greatest when i is fixed and the value of n is increased is defined as the size N (bits), and the value of TH (n, i) at that time is calculated as the throughput TH2.

If the conditions for shifting down the MCS are met, the setting module 40 shifts down the MCS by one stage when TH1 is equal to or greater than TH2, or decreases the size of the HARQ SUB-BURST to N bits when TH1 is less than TH2.

If the conditions for shifting up the MCS are met, the setting module 40 shifts up the MCS by one stage when TH1 is equal to or greater than TH2, or increases the size of the HARQ SUB-BURST to N bits when TH1 is less than TH2.

The control-information-transmission management module 46 manages information on the DL-MAP and ULMAP transmitted to the mobile phone.

The user-data-transmission management module 45 manages user data transmitted to the mobile phone.

In accordance with the encoding rate of the MCS designated by the setting module 40, the encoding module 44 encodes encoded downlink signals. The MCS establishes the modulation schemes (QPSK, 16 QAM, 64 QAM, etc.) and code rates (1/2, 2/3, 3/4).

In accordance with the MCS modulation scheme designated by the setting module 40, the modulator module 43 modulates downlink signals going to the mobile phone.

The retransmission control module 42 implements controls so that the HARQ retransmission unit (sub-bursts) corresponding to the received NACK are retransmitted.

Figure 5:
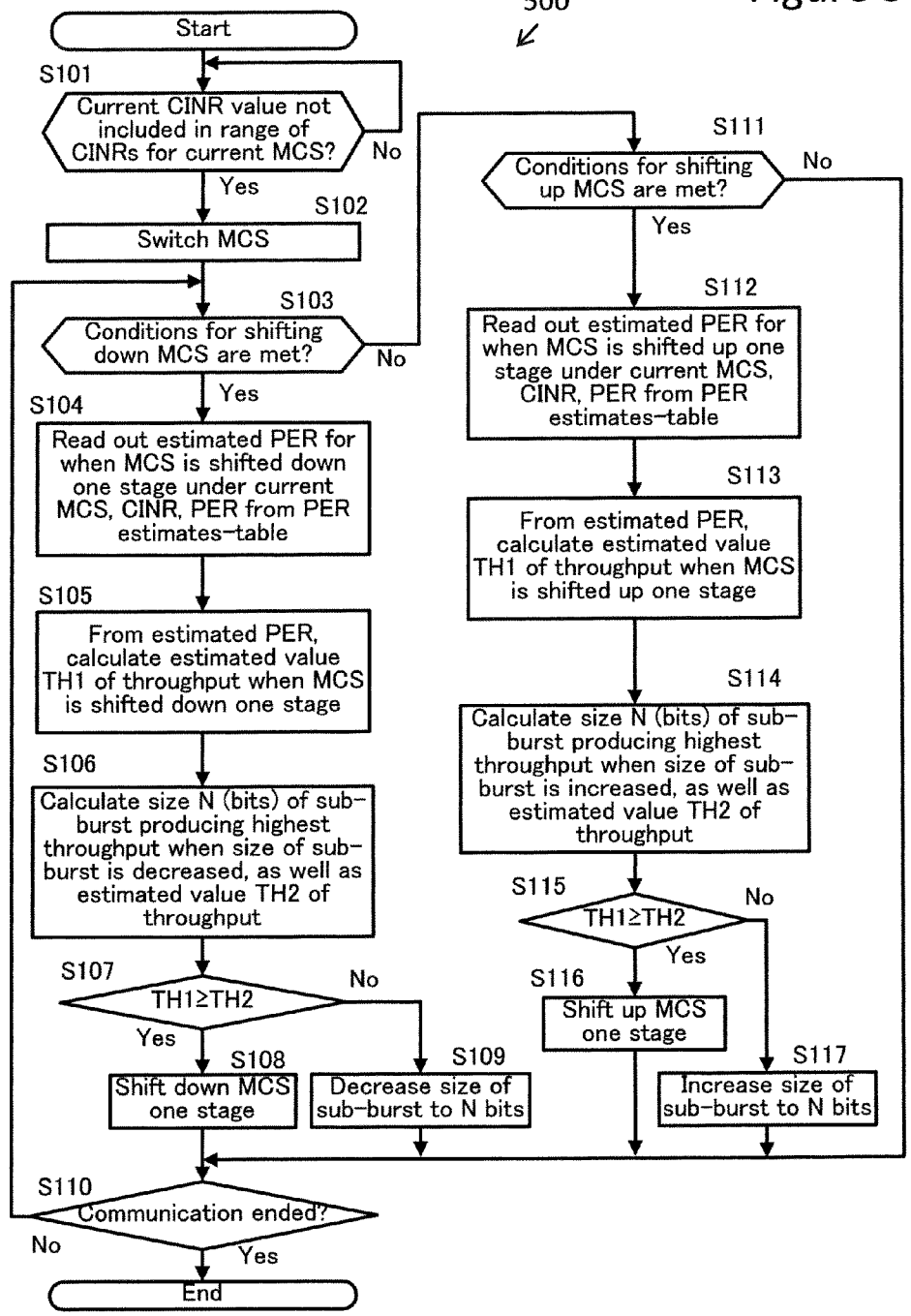
FIG. 5 is an illustration of an exemplary flowchart showing a process for setting an MCS and an HARQ retransmission unit in a base station according to an embodiment of the disclosure.

FIG. 5 is an illustration of an exemplary flowchart showing a process 500 for setting the MCS and the HARQ retransmission unit in the base station 100 according to an embodiment of the disclosure. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a computer CPU in which the computer-readable medium is stored.

It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. In practical embodiments, portions of the process 500 may be performed by different elements of the base station 100. Process 500 may have functions, material, and structures that are similar to the embodiments shown in FIGS. 1-4. Therefore common features, functions, and elements may not be redundantly described here.

As shown in FIG. 5, the setting module 40 acquires values of the current CINR and PER from the communication quality control module 35. The setting module 40 refers to the MCS table, and if the acquired CINR value is not included in the range of CINRs for the current MCS (task S101: YES), the setting module 40 switches the MCS so that the acquired CINR value is included in the range of CINRs (task S102).

Next, if the conditions for shifting down the MCS are met (e.g., if the mean value of the PER acquired from the communication quality control module 35 over the past 200 frames is about 10% or more) (task S103: YES), the TH1 calculating module 38 reads out the estimated PER for when the MCS is shifted down by one stage from the PER estimates table using the current MCS, the acquired CINR, and the acquired PER (task S104).

Next, based on the estimated PER, the TH1 calculating module 38 calculates the estimated value TH1 of the throughput when the MCS is shifted down by one stage (task S105).

Next, the TH2 calculating module 39 calculates the size N (bits) of the sub-burst producing the highest throughput when the size of the HARQ sub-burst is decreased within a prescribed range, as well as the estimated value TH2 of the throughput at that size N (task S106).

Next, when TH1 is equal to or greater than TH2 (task S107: YES), the setting module 40 shifts down the MCS by one stage (task S108).

On the other hand, if TH1 is less than TH2 (task S107: NO), the setting module 40 decreases the size of HARQ sub-burst to N bits (task S109).

Next, if the conditions for shifting up the MCS are met (e.g., if the mean value of the PER acquired from the communication quality control module 35 over the past 200 frames is less than about 5%) (task S111: YES), the TH1 calculating module 38 reads out the estimated PER for when the MCS is shifted up by one stage under the current MCS, the acquired CINR, and the acquired PER from the PER estimates table (task S112).

Next, based on the estimated PER, the TH1 calculating module 38 calculates the estimated value TH1 of the throughput when the MCS is shifted up by one stage (task S113).

Next, the TH2 calculating module 39 calculates the size N of the sub-burst producing the highest throughput when the size of the HARQ sub-burst is increased within a prescribed range, as well as the estimated value TH2 of the throughput at that size N (task S114).

Next, when TH1 is equal to or greater than TH2 (S115: YES), the setting module 40 shifts up the MCS by one stage (task S116).

On the other hand, when TH1 is less than TH2 (S115: NO), the setting module 40 increases the size of the HARQ sub-burst to N bits (task S117).

The processes of the above tasks S103 through S117 are repeated until the end of communication (task S110: YES).

As described above, it is possible to compare the estimated throughputs for cases of changing the MCS and cases of changing the size of the HARQ sub-burst and switch to the option providing the higher throughput.

Figure 6:
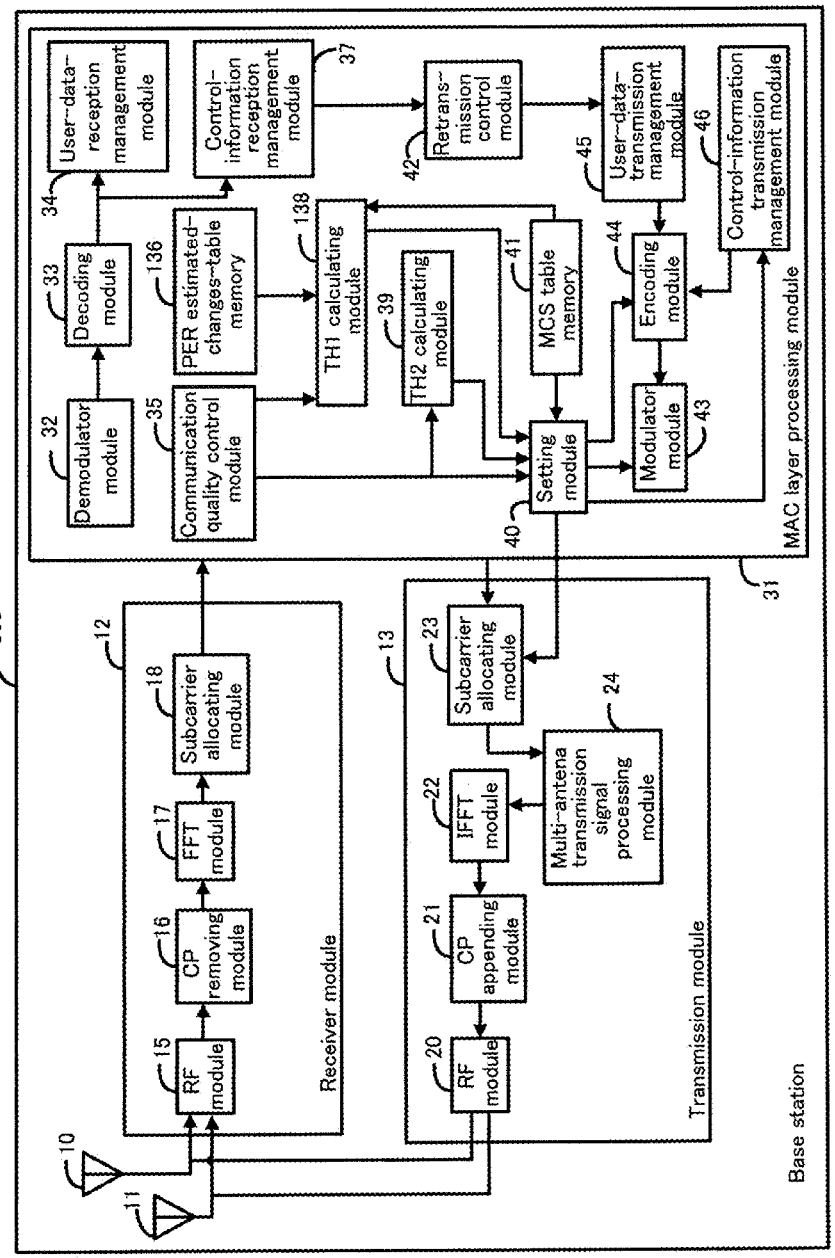
FIG. 6 is an illustration of an exemplary functional block diagram of a base station according to an embodiment of the disclosure.

FIG. 6 is an illustration of an exemplary functional block diagram of a base station 600 according to an embodiment of the disclosure.

The base station 600 differs from the base station 100 in terms of a method by which the TH1 calculating module 138 calculates the estimated PER, as well as the PER estimated-changes-table memory 136.

The PER estimated-changes-table memory 136 stores a PER estimated-changes table that defines estimated changes in the PER when the MCS is shifted down by one stage in relation to the current MCS and the current CINR, as well as estimated changes in the PER when the MCS is shifted up by one stage in relation to the current MCS and the current CINR.

FIGS. 7A-7B are illustrations of exemplary PER estimated-changes tables according to embodiments of the disclosure. In FIG. 7A, estimated changes in the PER for when the MCS is shifted up by one stage in relation to the current MCS and the current CINR are defined. For example, if the current MCS is QPSK 1/2 and the CINR is 0, 1, or 2, the estimated change in the PER when the MCS is shifted up by one stage is Δ ua1%, Δua2%, or Δua3%, respectively.

In FIG. 7B, estimated changes in the PER for when the MCS is shifted down by one stage in relation to the current MCS and the current CINR are defined. For example, if the current MCS is QPSK 3/4 and the CINR is 0, 1, or 2, the estimated change in the PER when the MCS is shifted down by one stage is −Δda1%, −Δda2%, or −Δda3%, respectively.

If the conditions for shifting down the MCS are met, the TH1 calculating module 138 refers to the PER estimated-changes table, and by using the current MCS and the acquired CINR, reads out the estimated change in the PER when the MCS is shifted down by one stage. The TH1 calculating module 138 adds the read-out estimated change in the PER and the acquired PER to calculate the estimated PER.

If the conditions for shifting up the MCS are met, the TH1 calculating module 138 refers to the PER estimated-changes table, and reads out the estimated change in the PER when the MCS is shifted up by one stage under the current MCS and the acquired CINR. The TH1 calculating module 138 adds the read-out estimated change in the PER and the acquired PER to calculate the estimated PER.

Figure 8:
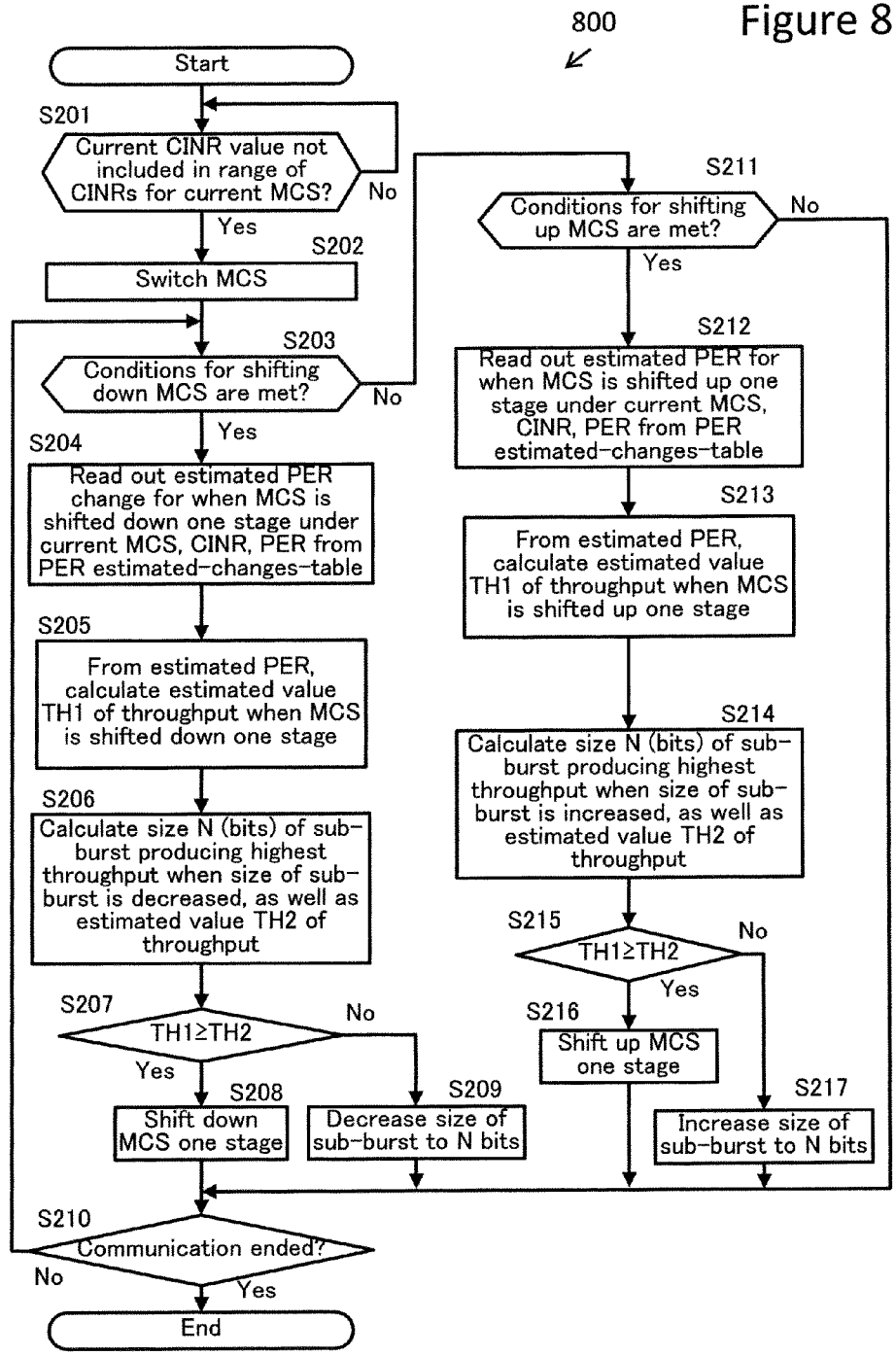
FIG. 8 is an illustration of an exemplary flowchart showing a process for setting an MCS and an HARQ retransmission unit in the base station according to an embodiment of the disclosure.

FIG. 8 is an illustration of an exemplary flowchart showing a process 800 for setting the MCS and the HARQ retransmission unit in the base station 600 according to an embodiment of the disclosure. The various tasks performed in connection with the process 800 may be performed by software, hardware, firmware, a computer-readable medium having computer executable instructions for performing the process method, or any combination thereof. The process 800 may be recorded in a computer-readable medium such as a semiconductor memory, a magnetic disk, an optical disk, and the like, and can be accessed and executed, for example, by a computer CPU in which the computer-readable medium is stored.

It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein. In practical embodiments, portions of the process 800 may be performed by different elements of the base station 600. Process 800 may have functions, material, and structures that are similar to the embodiments shown in FIGS. 1-7. Therefore common features, functions, and elements may not be redundantly described here.

As shown in FIG. 8, the setting module 40 acquires the values of the current CINR and PER from the communication quality control module 35. The setting module 40 refers to the MCS table, and if the acquired CINR value is not included in the range of CINRs for the current MCS (task S201: YES), it switches the MCS so that the acquired CINR value is included in the range of CINRs (task S202).

Next, if the conditions for shifting down the MCS are met (e.g., if the mean value of the PER acquired from the communication quality control module 35 over the past 200 frames is about 10% or more) (task S203: YES), the TH1 calculating module 138 refers to the PER estimated-changes table and reads out the estimated change in the PER when the MCS is shifted down by one stage under the current MCS and the acquired CINR. The TH1 calculating module 138 adds the read-out estimated change in the PER and the acquired PER to calculate the estimated PER (task S204).

Next, based on the estimated PER, the TH1 calculating module 138 calculates the estimated value TH1 of the throughput when the MCS is shifted down by one stage (task S205).

Next, the TH2 calculating module 39 calculates the size N (bits) of the sub-burst producing the highest throughput when the size of the HARQ sub-burst is decreased within a prescribed range, as well as the estimated value TH2 of the throughput at that size N (task S206).

Next, when TH1 is equal to or greater than TH2 (task S207: YES), the setting module 40 shifts down the MCS by one stage (task S208).

On the other hand, if TH1 is less than TH2 (task S207: NO), the setting module 40 decreases the size of the HARQ sub-burst to N bits (task S209).

Next, if the conditions for shifting up the MCS are met (e.g., if the mean value of the PER acquired from the communication quality control module 35 over the past 200 frames is less than about 5%) (task S211: YES), the TH1 calculating module 138 refers to the PER estimated-changes table and reads out the estimated change in the PER when the MCS is shifted up by one stage under the current MCS and the acquired CINR. The TH1 calculating module 138 adds the read-out estimated change in the PER and the acquired PER to calculate the estimated PER (task S212).

Next, based on the estimated PER, the TH1 calculating module 138 calculates the estimated value TH1 of the throughput when the MCS is shifted up by one stage (task S213).

Next, the TH2 calculating module 39 calculates the size N of the sub-burst producing the highest throughput when the HARQ sub-burst is increased within a prescribed range, as well as the estimated value TH2 of the throughput at that size N (task S214).

Next, when TH1 is equal to or greater than TH2 (task S215: YES), the setting module 40 shifts up the MCS by one stage (task S216).

On the other hand, when TH1 is less than TH2 (task S215: NO), the setting module 40 increases the size of the HARQ sub-burst to N bits (task S217).

The processes of the above tasks S203 through S217 are repeated until the communication is ended (task S210: YES).

As described above, according to the base station 600, as with the station 100, it is possible to compare the estimated throughputs for cases of changing the MCS and cases of changing the size of the HARQ sub-burst, and to switch to the option providing the higher throughput.

Figure 9:
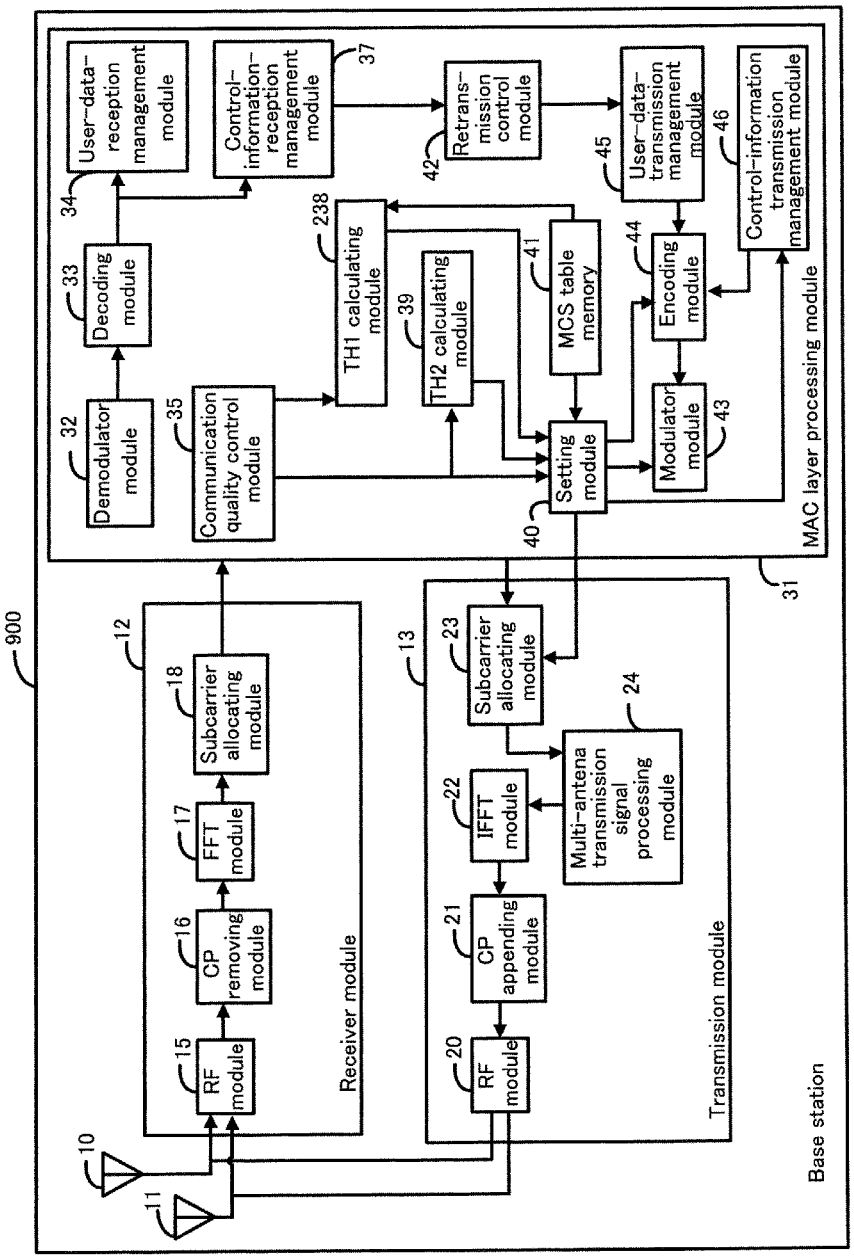
FIG. 9 is an illustration of an exemplary functional block diagram of a base station according to an embodiment of the disclosure.

FIG. 9 is an illustration of an exemplary functional block diagram of a base station 900 according to an embodiment of the disclosure. The base station 900 differs from the base station 100 in that the base station 900 does not comprise the PER estimates-table memory 36, and also in terms of the functions of the TH1 calculating module 238.

The TH1 calculating module 238 sends instructions to the encoding module 44 and the modulator module 32, and causes them to temporarily shift down or shift up the current MCS by one stage and perform test communication.

The TH1 calculating module 238 calculates the throughput TH1 during the test communication.

Figure 10:
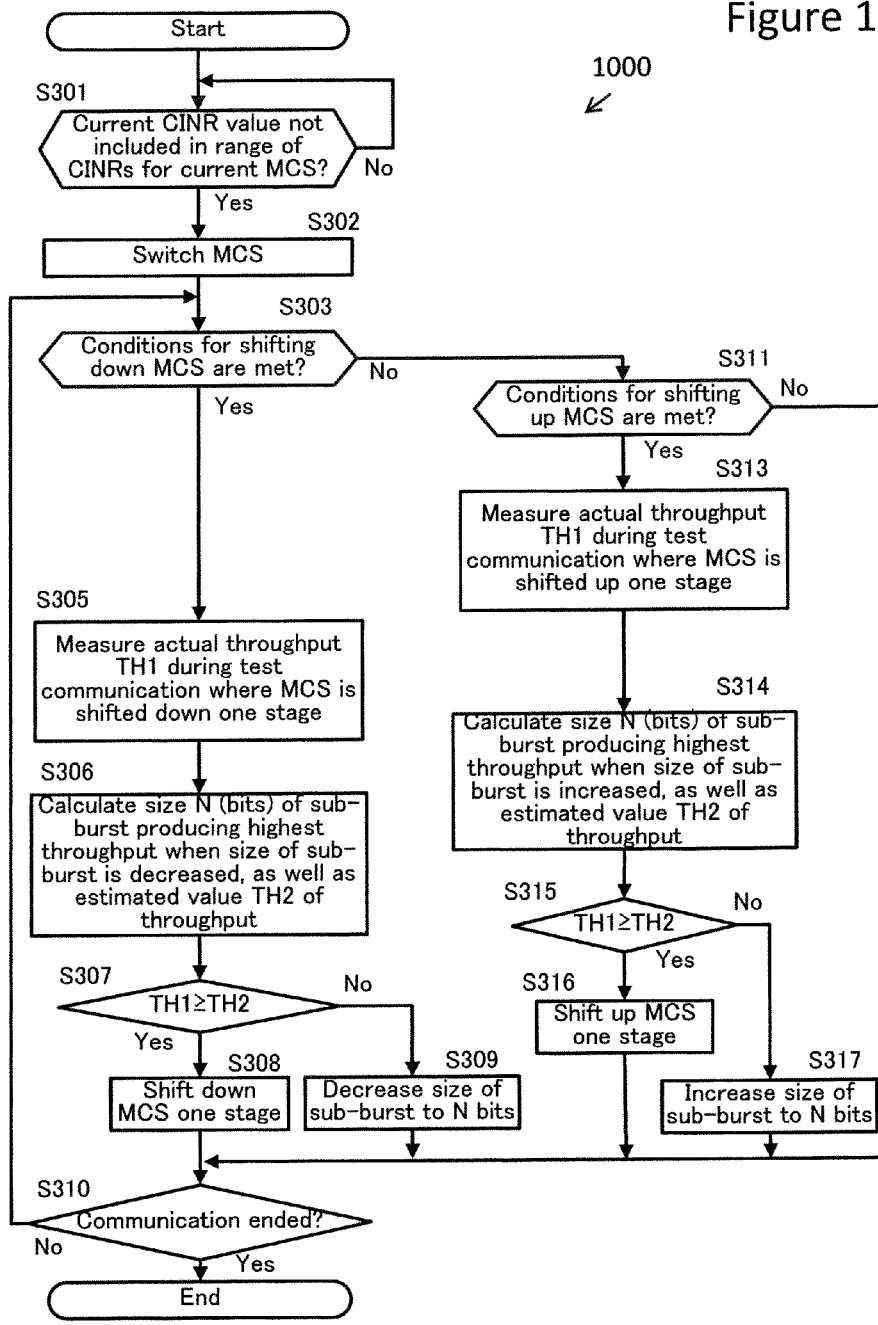
FIG. 10 is an illustration of an exemplary flowchart showing a process for setting an MCS and an HARQ retransmission unit in the base station.

FIG. 10 is an illustration of an exemplary flowchart showing a process 1000 for setting the MCS and the HARQ retransmission unit in the base station 900. The various tasks performed in connection with the process 1000 may be performed by software, hardware, firmware, a computer-readable medium having computer executable instructions for performing the process method, or any combination thereof. The process 1000 may be recorded in a computer-readable medium such as a semiconductor memory, a magnetic disk, an optical disk, and the like, and can be accessed and executed, for example, by a computer CPU in which the computer-readable medium is stored.

It should be appreciated that process 1000 may include any number of additional or alternative tasks, the tasks shown in FIG. 10 need not be performed in the illustrated order, and process 1000 may be incorporated into a more comprehensive procedure or process having additional functionality not described in detail herein. In practical embodiments, portions of the process 800 may be performed by different elements of the base station 900. Process 800 may have functions, material, and structures that are similar to the embodiments shown in FIGS. 1-9. Therefore common features, functions, and elements may not be redundantly described here.

As shown in FIG. 10, the setting module 40 acquires the values of the current CINR and PER from the communication quality control module 35. The setting module 40 refers to the MCS table, and if the acquired CINR value is not included in the range of CINRs for the current MCS (task S301: YES), it switches the MCS so that the acquired CINR value is included in the range of CINRs (task S302).

Next, if the conditions for shifting down the MCS are met (e.g., if the mean value of the PER acquired from the communication quality control module 35 over the past 200 frames is about 10% or more) (task S303: YES), the TH1 calculating module 238 instructs the encoding module and the modulator module to temporarily shift down the current MCS by one stage and perform test communication, and calculates the throughput TH1 during the test communication (task S305).

Next, the TH2 calculating module 39 calculates the size N (bits) of the sub-burst producing the highest throughput when the size of the HARQ sub-burst is decreased within a prescribed range, as well as the estimated value TH2 of the throughput at that size N (task S306).

Next, when TH1 is equal to or greater than TH2 (task S307: YES), the setting module 40 shifts down the MCS by one stage (task S308).

On the other hand, when TH1 is less than TH2 (task S307: NO), the setting module 40 decreases the size of the HARQ sub-burst to N bits (task S309).

Next, if the conditions for shifting up the MCS are met (e.g., if the mean value of the PER acquired from the communication quality control module 35 over the past 200 frames is less than 5%) (task S311: YES), the TH1 calculating module 238 instructs the encoding module and the modulator module to temporarily shift up the current MCS by one stage and perform test communication, and calculates the throughput TH1 during the test communication (task S313).

Next, the TH2 calculating module 39 calculates the size N of the sub-burst producing the highest throughput when the size of the HARQ SUB-BURST is increased within a prescribed range, as well as the estimated value TH2 of the throughput at that size N (task S314).

Next, when TH1 is equal to or greater than TH2 (task S315: YES), the setting module 40 shifts up the MCS by one stage (task S316).

On the other hand, when TH1 is less than TH2 (task S315: NO), the setting module 40 increases the size of the HARQ sub-burst to N bits (task S317).

The processes of the above tasks S303 through S317 are repeated until the communication is ended (task S310: YES).

As described above, according to the base station 900, it is possible to compare the actual measured throughput for cases of changing the MCS with the predicted throughputs for cases of changing the size of the HARQ sub-burst, and to switch to the option providing the higher throughput.

Figure 11:
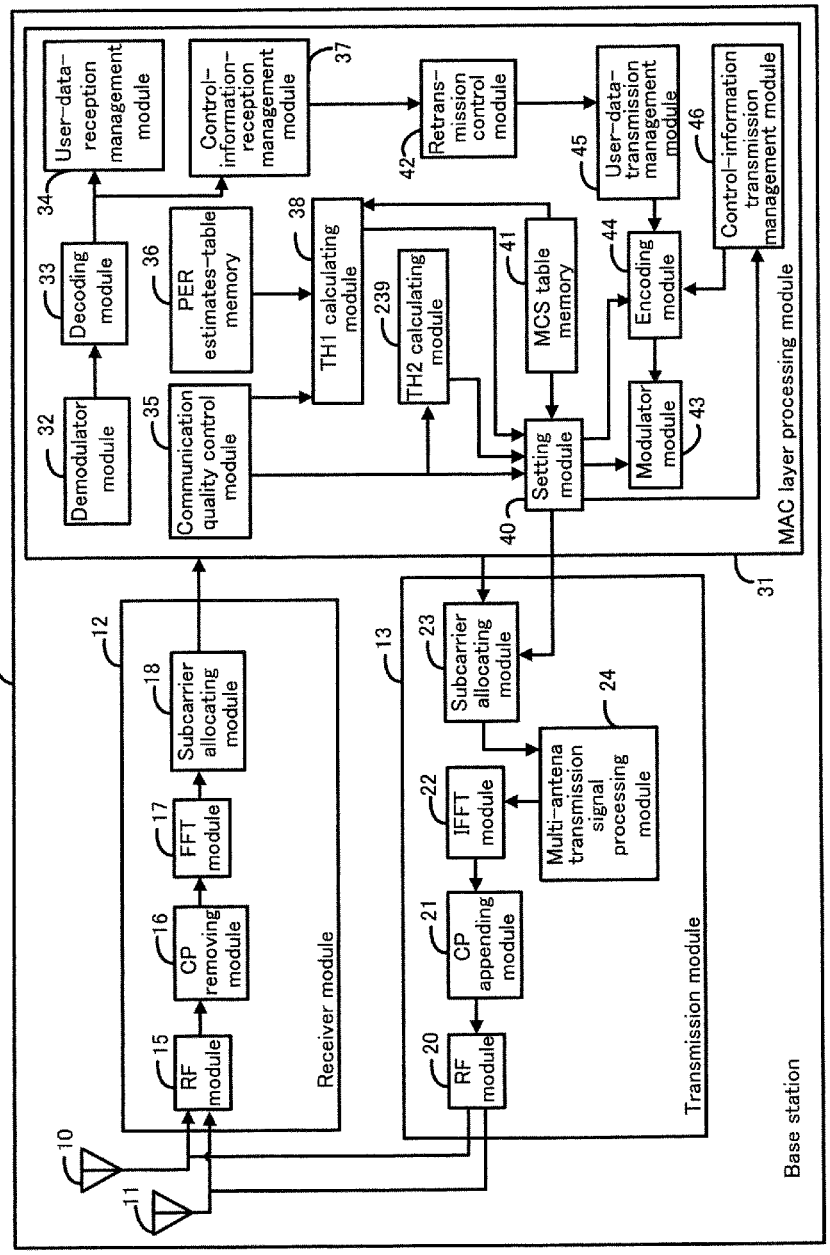
FIG. 11 is an illustration of an exemplary functional block diagram of a base station according to an embodiment of disclosure.

FIG. 11 is an illustration of an exemplary functional block diagram of a base station 1100 according to an embodiment of disclosure.

The base station 1100 differs from the base station 100 in terms of the functions of the TH2 calculating module 239.

The TH2 calculating module 239 instructs the setting module 40 to temporarily decrease or increase the size of the current HARQ sub-burst within a prescribed range and perform test communication. During the test communication, the TH2 calculating module 239 calculates the size N (bits) of the sub-burst producing the highest throughput, as well as the throughput TH2 at that size N.

Figure 12:
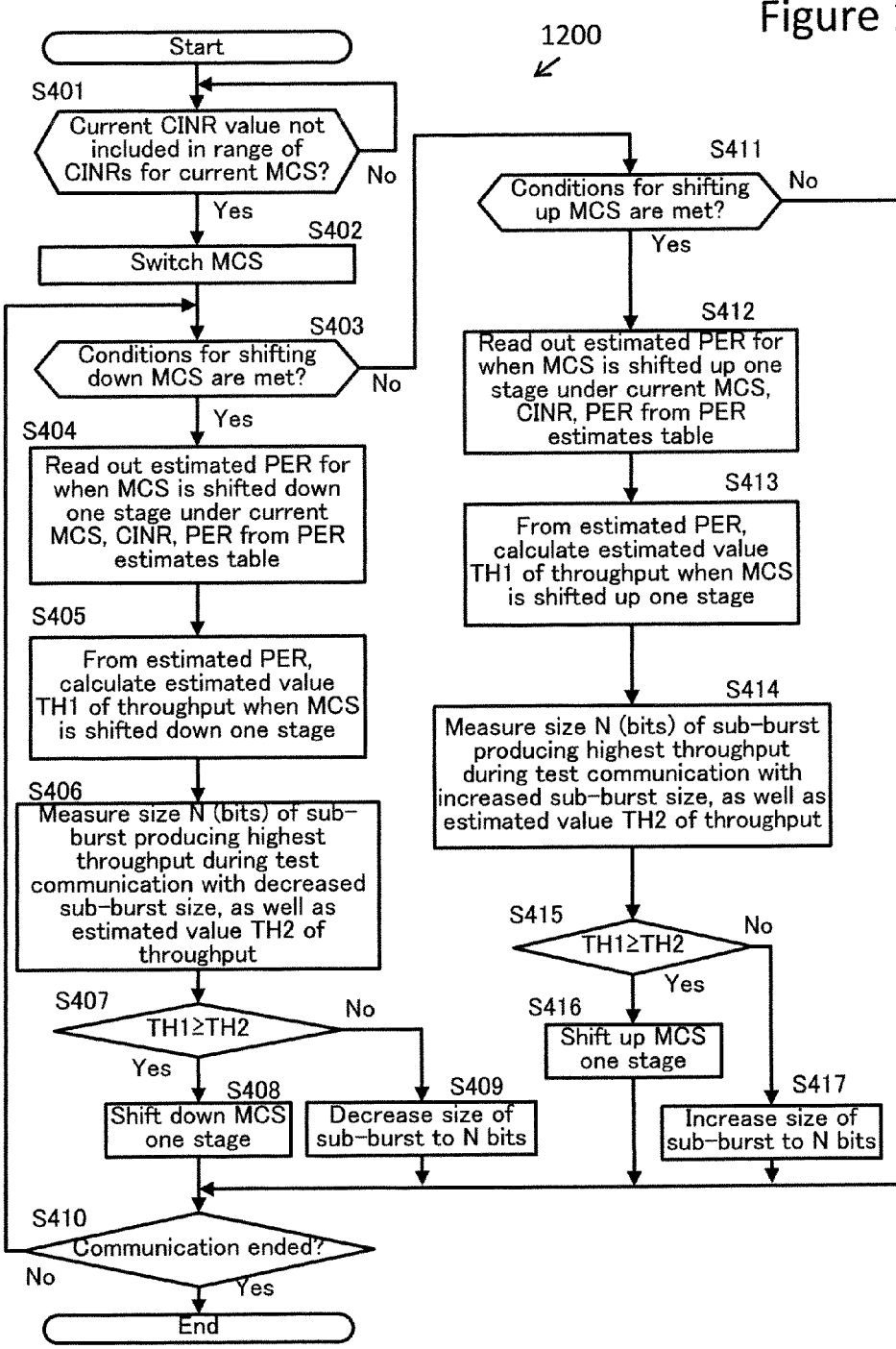
FIG. 12 is an illustration of an exemplary flowchart showing a process for setting an MCS and an HARQ retransmission unit of the base station according to an embodiment of the disclosure.

FIG. 12 is an illustration of an exemplary flowchart showing a process 1200 for setting the MCS and the HARQ retransmission unit of the base station 1100 according to an embodiment of the disclosure. The various tasks performed in connection with the process 1200 may be performed by software, hardware, firmware, a computer-readable medium having computer executable instructions for performing the process method, or any combination thereof. The process 1200 may be recorded in a computer-readable medium such as a semiconductor memory, a magnetic disk, an optical disk, and the like, and can be accessed and executed, for example, by a computer CPU in which the computer-readable medium is stored.

It should be appreciated that process 1200 may include any number of additional or alternative tasks, the tasks shown in FIG. 12 need not be performed in the illustrated order, and process 1200 may be incorporated into a more comprehensive procedure or process having additional functionality not described in detail herein. In practical embodiments, portions of the process 1200 may be performed by different elements of the base station 1100. Process 1200 may have functions, material, and structures that are similar to the embodiments shown in FIGS. 1-11. Therefore common features, functions, and elements may not be redundantly described here.

As shown in FIG. 12, the setting module 40 acquires the values of the current CINR and PER from the communication quality control module 35. The setting module 40 refers to the MCS table, and if the acquired CINR value is not included in the range of CINRs for the current MCS (task S401: YES), it switches the MCS so that the acquired CINR value is included in the CINR range (task S402).

Next, if the conditions for shifting down the MCS are met (e.g., if the mean value of the PER acquired from the communication quality control module 35 over the past 200 frames is 10% or more) (task S403: YES), the TH1 calculating module 38 reads out the estimated PER when the MCS is shifted down by one stage under the current MCS, the acquired CINR, and the acquired PER from the PER estimates table (task S404).

Next, based on the estimated PER, the TH1 calculating module 38 calculates the estimated value TH1 of the throughput when the MCS is shifted down by one stage (task S405).

Next, the TH2 calculating module 239 instructs the setting module 40 to temporarily decrease the size of the current HARQ SUB-BURST within a prescribed range and perform test communication. During the test communication, the TH2 calculating module 239 calculates the size N (bits) of the sub-burst producing the highest throughput, as well as the throughput TH2 at that size N (task S406).

Next, when TH1 is equal to or greater than TH2 (task S407: YES), the setting module 40 shifts down the MCS by one stage (task S408).

On the other hand, when TH1 is less than TH2 (task S407: NO), the setting module 40 decreases the size of the HARQ SUB-BURST to N bits (task S409).

Next, if the conditions for shifting up the MCS are met (e.g., if the mean value of the PER acquired from the communication quality control module 35 over the past 200 frames is less than 5%) (task S411: YES), the TH1 calculating module 38 reads out the predicted PER for when the MCS is shifted up by one stage under the current MCS, the acquired CINR, and the acquired PER from the PER estimates table (task S412).

Next, based on the estimated PER, the TH1 calculating module 38 calculates the predicted value TH1 of the throughput when the MCS is shifted up by one stage (task S413).

Next, the TH2 calculating module 239 instructs the setting module 40 to temporarily increase the size of the current HARQ SUB-BURST within a prescribed range and perform test communication. During the test communication, the TH2 calculating module 239 calculates the size N (bits) of the sub-burst producing the highest throughput, as well as the throughput TH2 at that size N (task S414).

Next, when TH1 is equal to or greater than TH2 (task S415: YES), the setting module 40 shifts up the MCS by one stage (task S416).

On the other hand, when TH1 is less than TH2 (task S415: NO), the setting module 40 increases the size of the HARQ SUB-BURST to N bits (task S417).

The processes of the above tasks S403 through S417 are repeated until the communication is ended (task S410: YES).

As described above, the base station 1100 is able to compare the predicted throughputs for cases of changing the MCS with actual measured throughputs for cases of changing the size of the HARQ sub-burst, and to switch to the option providing the higher throughput.

Figure 13:
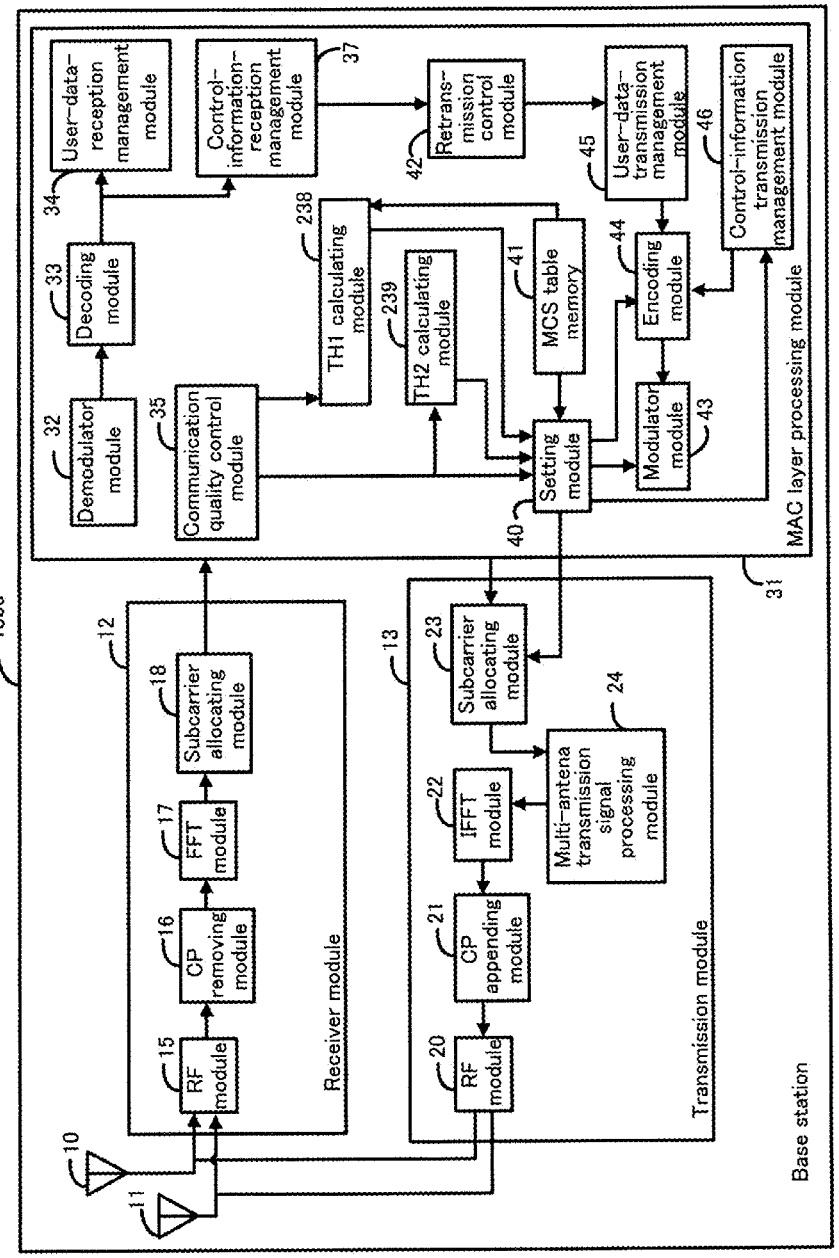
FIG. 13 is an illustration of an exemplary functional block diagram of a base station according to an embodiment of the disclosure.

FIG. 13 is an illustration of an exemplary functional block diagram of a base station 1300 according to an embodiment of the disclosure.

The base station 1300 differs from the base station 100 in that it does not comprise the PER estimates-table memory 36, and in terms of the functions of the TH1 calculating module 238 and the TH2 calculating module 239.

The TH1 calculating module 238 instructs the encoding module and the modulator module to temporarily shift down or shift up the current MCS by one stage and perform test communication. The TH1 calculating module 238 calculates the throughput TH1 during the test communication.

The TH2 calculating module 239 instructs the setting module 40 to temporarily decrease or increase the size of the current HARQ SUB-BURST within a prescribed range and perform test communication. During the test communication, the TH2 calculating module 239 calculates the size N (bits) of the sub-burst producing the highest throughput, as well as the throughput TH2 at that size N.

Figure 14:
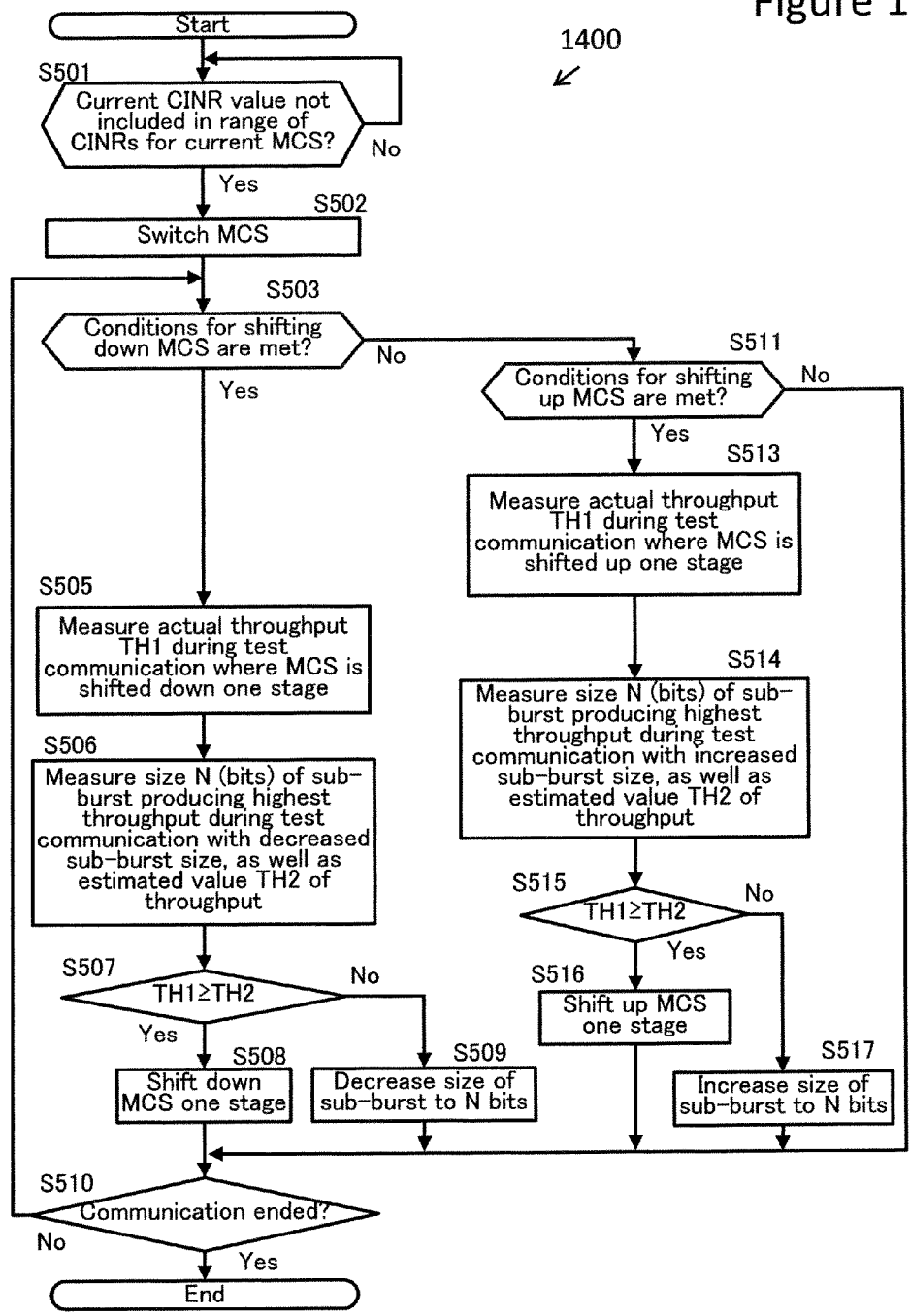
FIG. 14 is an illustration of an exemplary flowchart showing a process for setting an MCS and an HARQ retransmission unit of a base station according to an embodiment of the disclosure.

FIG. 14 is an illustration of an exemplary flowchart showing a process 1400 for setting the MCS and the HARQ retransmission unit of the base station 1300 according to an embodiment of the disclosure. The various tasks performed in connection with the process 1400 may be performed by software, hardware, firmware, a computer-readable medium having computer executable instructions for performing the process method, or any combination thereof. The process 1400 may be recorded in a computer-readable medium such as a semiconductor memory, a magnetic disk, an optical disk, and the like, and can be accessed and executed, for example, by a computer CPU in which the computer-readable medium is stored.

It should be appreciated that process 1400 may include any number of additional or alternative tasks, the tasks shown in FIG. 14 need not be performed in the illustrated order, and process 1400 may be incorporated into a more comprehensive procedure or process having additional functionality not described in detail herein. In practical embodiments, portions of the process 1400 may be performed by different elements of the base station 1300. Process 1400 may have functions, material, and structures that are similar to the embodiments shown in FIGS. 1-13. Therefore common features, functions, and elements may not be redundantly described here.

The setting module 40 acquires the values of the current CINR and PER from the communication quality control module 35. The setting module 40 refers to the MCS table, and if the acquired CINR value is not included in the range of CINRs for the current MCS (task S501: YES), it switches the MCS so that the acquired CINR value is included in the range of CINRs (task S502).

Next, if the conditions for shifting down the MCS are met (e.g., if the mean value of the PER acquired from the communication quality control module 35 over the past 200 frames is about 10% or more) (task S503: YES), the TH1 calculating module 238 instructs the encoding module and the modulator module to temporarily shift down the current MCS by one stage and perform test communication, and calculates the throughput TH1 during the test communication (task S505).

Next, the TH2 calculating module 239 instructs the setting module 40 to temporarily decrease the size of the current HARQ SUB-BURST within a prescribed range and perform test communication. During the test communication, the TH2 calculating module 239 calculates the size N (bits) of the sub-burst producing the highest throughput, as well as the throughput TH2 at that size N (task S506).

Next, when TH1 is equal to or greater than TH2 (task S507: YES), the setting module 40 shifts down the MCS by one stage (task S508).

On the other hand, when TH1 is less than TH2 (task S507: NO), the setting module 40 decreases the size of the HARQ sub-burst to N bits (task S509).

Next, if the conditions for shifting up the MCS are met (e.g., if the mean value of the PER acquired from the communication quality control module 35 over the past 200 frames is less than 5%) (task S511: YES), the TH1 calculating module 238 instructs the encoding module and the modulating module to temporarily shift up the current MCS by one stage and perform test communication, and calculates the throughput TH1 during the test communication (task S513).

Next, the TH2 calculating module 239 instructs the setting module 40 to temporarily increase the size of the current HARQ sub-burst within a prescribed range and perform test communication. During the test communication, the TH2 calculating module 239 calculates the size N (bits) of the sub-burst producing the highest throughput, as well as the throughput TH2 at that size N (task S514).

Next, when TH1 is equal to or greater than TH2 (task S515: YES), the setting module 40 shifts up the MCS by one stage (task S516).

On the other hand, when TH1 is less than TH2 (task S515: NO), the setting module 40 increases the size of the HARQ sub-burst to N bits (task S517).

The processes of the above tasks S503 through S517 are repeated until the communication is ended (task S510: YES).

As described above, according to the base station 1300, it is possible to compare actual measured throughputs for cases of changing the MCS with actual measured throughputs for cases of changing the size of the HARQ sub-burst, and to switch to the option providing the higher throughput.

The above description is exemplary in nature and is not intended to limit the disclosure or the application and uses of the embodiments of the disclosure. For example, in FIGS. 5, 8, 10, 12, and 14, the processes return to tasks S103, S203, S303, S403, and S503, respectively until the communication is ended, but the present invention is not limited to this. For example, a configuration may be provided in which, if fluctuations in the CINR are so great as to span across three MCS levels, the processes may return to tasks S101, S202, S301, S401, and S501, respectively, and if there are no such great fluctuations in the CINR, the processes may return to tasks S103, S203, S303, S403, and S503, respectively.

In this document, the terms "computer program product", "computer-readable medium", and the like may be used generally to refer to media such as, for example, memory, storage devices, or storage unit. These and other forms of computer-readable media may be involved in storing one or more instructions for use by a CPU of the base station 100/600/900/1100/1300 to cause the CPU to perform specified operations. Such instructions, generally referred to as "computer program code" or "program code" (which may be grouped in the form of computer programs or other groupings), when executed, enable a method of using the base station 100/600/900/1100/1300.

A practical base station 100/600/900/1100/1300 may comprise any number of CPU modules, any number of memory modules, and any number of receiver modules, any number of transmitter modules, and nay number of other modules. The illustrated base station 100/600/900/1100/1300 depicts a simple embodiment for ease of description. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A communication device comprising:
   at least one processor, wherein the at least one processor comprises:
   a first calculating module operable to calculate a first throughput corresponding to a current modulation scheme and a current encoding rate being changed in the future;
   a second calculating module operable to calculate a second throughput corresponding to a current retransmission unit being changed in the future;
   a setting module operable to:
      compare the first throughput with the second throughput;
      change the current modulation scheme and the current encoding rate if the first throughput is greater than or equal to the second throughput; or
      change the current retransmission unit if the first throughput is less than the second throughput; and
   a transmission module operable to transmit data based on the changed modulation scheme and the changed encoding rate if the first throughput is greater than or equal to the second throughput, or the changed retransmission unit if the first throughput is less than the second throughput.

2. The communication device according to claim 1, wherein the transmission module is further operable to transmit control data comprising information defining a region of each retransmission unit.

3. The communication device according to claim 2, wherein the first calculating module is further operable to calculate the first throughput by subtracting a first amount of data required to transmit the control data within a prescribed time from a second amount of data that can be transmitted within the prescribed time under the changed modulation scheme and the changed encoding rate, the current retransmission unit, and an acquired error rate.

4. The communication device according to claim 3, wherein the second calculating module is further operable to calculate the second throughput by subtracting a third amount of data required to transmit the control data comprising information defining a region of the changed retransmission unit within the prescribed time from a fourth amount of data that can be transmitted within the prescribed time under the current modulation scheme and the current encoding rate, a changed retransmission unit, and the acquired error rate.

5. The communication device according to claim 1, wherein the first calculating module is further operable to calculate the first throughput when the current modulation scheme and the current encoding rate are shifted down by one stage.

6. The communication device according to claim 5, wherein: the second calculating module is further operable to: calculate the second throughput when the current retransmission unit is decreased within a prescribed range to provide a maximum throughput; and identify the retransmission unit when the second throughput reaches the maximum throughput to provide a reduced retransmission unit.

7. The communication device according to claim 6 wherein the setting module is further operable to: shift down the current modulation scheme and encoding rate by one stage, if the first throughput is equal to or greater than the second throughput when the prescribed conditions are met; and change the retransmission unit to the reduced retransmission unit if the first throughput is less than the second throughput.

8. The communication device according to claim 1, further comprising: a memory operable to associate and store at least one of: estimated packet error rates of a modulation scheme and an encoding rate shifted down by one stage from the current modulation scheme and the current encoding rate, a current carrier-to-interference-and-noise ratio, and a current packet error rate; and a communication quality control module operable to acquire a carrier-to-interference-and-noise ratio and a packet error rate of received signals received from a communication device of a communication partner to provide an acquired carrier-to-interference-and-noise ratio and an acquired packet error rate.

9. The communication device according to claim 8, wherein: the memory is further operable to store a required range comprising carrier-to-interference-and-noise ratios corresponding to levels of modulation schemes and encoding rates; and the setting module is further operable to:
  switch to a first modulation scheme and a first encoding rate such that the required range comprises the acquired carrier-to-interference-and-noise ratio, if the required range does not comprise the acquired carrier-to-interference-and-noise ratio under the current modulation scheme and the current encoding rate.

10. The communication device according to claim 9, wherein: the setting module is further operable to: perform one of: shifting down of the first modulation scheme and the first encoding rate and change the retransmission unit, when the acquired packet error rate meets conditions for a shift down.

11. The communication device according to claim 9, wherein: the setting module is further operable to: perform one of: shifting up the first modulation scheme and the first encoding rate and changing the retransmission unit, after the switching of the modulation scheme and encoding rate, when the acquired error rate of the received signals meets the conditions for a shift up.

12. The communication device according to claim 8, wherein the first calculating module is further operable: obtain the estimated packet error rates when the modulation scheme and encoding rate are shifted down by one stage under the current modulation scheme and the current encoding rate, the acquired carrier-to-interference-and-noise ratio, and the acquired packet error rate; and calculate the first throughput based on the estimated value.

13. The communication device according to claim 8, wherein: the memory is further operable to associate and store estimated packet error rates of a modulation scheme and an encoding rate are shifted up by one stage from the current modulation scheme and encoding rate; and the first calculating module is further operable to: obtain a first estimated packet error rate among the estimated packet error rates when the modulation scheme and the encoding rate are shifted by one stage under the current modulation scheme and encoding rate, the acquired carrier to interference and noise ratio and the acquired packet error rate; and calculate the first throughput based on the first estimated packet error rate.

14. The communication device according to claim 1, wherein the first calculating module is further operable to: shift down the current modulation scheme and encoding rate by one stage to perform a test communication; and calculate a throughput during the test communication to provide the first throughput.

15. The communication device according to claim 1, wherein the second calculating module is further operable to: decrease the current retransmission unit within a prescribed range to perform a test communication; and calculate a maximum throughput obtained through the test communication to provide the second throughput.

16. The communication device according to claim 1, wherein:
  the first calculating module is further operable to calculate the first throughput when the current modulation scheme and encoding rate are shifted up by one stage to provide the first throughput;
  the second calculating module is further operable to: calculate a maximum throughput when the current retransmission unit is increased within a prescribed range to provide the second throughput; and identify the retransmission unit when the throughput reaches its maximum to provide an enlarged retransmission unit; and
  the setting module is further operable to: shift up the current modulation scheme and encoding rate by one stage, if the first throughput is equal to or greater than the second throughput; and change the retransmission unit to the enlarged retransmission unit, if the first throughput is less than the second throughput.

17. The communication device according to claim 1, wherein the first calculating module is further operable to: shift up the current modulation scheme and the encoding rate by one stage to perform a test communication; and calculate a throughput during the test communication as the first throughput.

18. The communication device according to claim 1, wherein the second calculating module is further operable to: increase the current retransmission unit within a prescribed range to perform a test communication; and calculate a maximum throughput obtained through the test communication to provide the second throughput.

19. A communication method of a communication device comprising:
  calculating a first throughput corresponding to a current modulation scheme and a current encoding rate being changed in the future;
  calculating a second throughput corresponding to a current retransmission unit being changed in the future;
  comparing the first throughput with the second throughput;
  changing the current modulation scheme and the current encoding rate if the first throughput is greater than or equal to the second throughput;
  changing the current retransmission unit if the first throughput is less than the second throughput; and
  transmitting information based on the changed modulation scheme and the changed encoding rate if the first throughput is greater than or equal to the second throughput, or the changed retransmission unit if the first throughput is less than the second throughput.

20. A non-transitory computer readable storage medium comprising computer-executable instructions for performing a communication method of a communication device, the method executed by the computer-executable instructions comprising:
  calculating a first throughput corresponding to a current modulation scheme and a current encoding rate being changed in the future;
  calculating a second throughput corresponding to a current retransmission unit being changed in the future;
  comparing the first throughput with the second throughput;
  changing the current modulation scheme and the current encoding rate if the first throughput is greater than or equal to the second throughput;
  changing the current retransmission unit if the first throughput is less than the second throughput; and
  transmitting information based on the changed modulation scheme and the changed encoding rate if the first throughput is greater than or equal to the second throughput, or the changed retransmission unit if the first throughput is less than the second throughput.

* * * * *